Patented Oct. 10, 1950

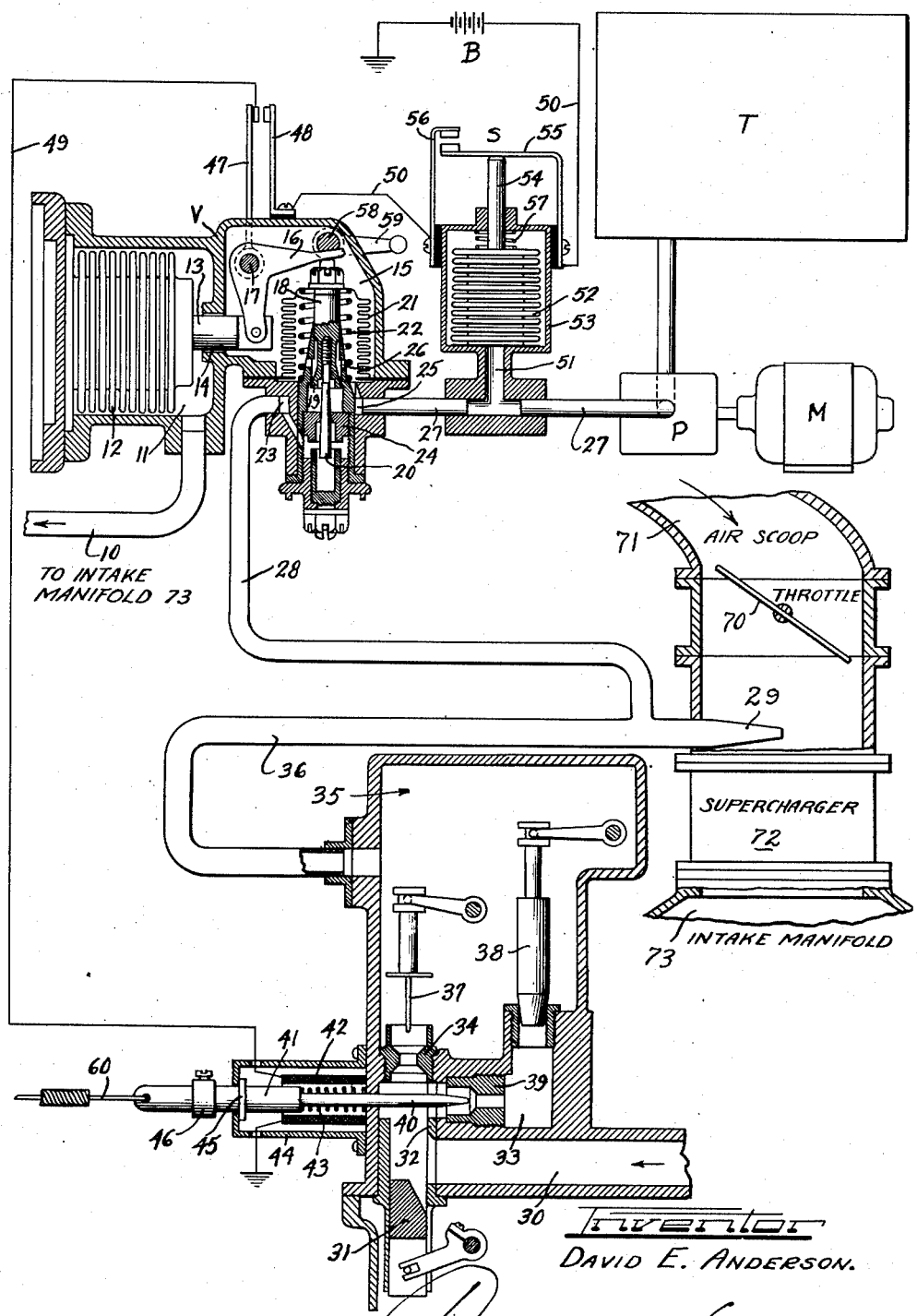

2,525,576

UNITED STATES PATENT OFFICE 2,525,576

SUPPLEMENTARY FUEL INJECTION SYSTEM

David E. Anderson, Cleveland, Ohio, assignor to Thompson Products, Inc., Cleveland, Ohio, a corporation of Ohio Application July 17, 1944, Serial No. 545,375

5 Claims. (Cl. 123—25)

My invention relates to an improved fuel injection system adapted particularly for use on aircraft for automatically injecting into the main gasoline-air-stream at the carburetor, a relatively small amount of a supplemental fuel, such as alcohol and water, to serve merely as a supplementary agent to control combustion and improve the antiknock quality of the gasoline. In the operation of aircraft, a full rich power mixture is required at times in the engine supercharger, as for example, at take-off. In injection carburetors valves are usually provided for additional gasoline flow for such rich power mixture. However, with such rich gasoline mixture, corresponding increase in heat results and the engine will tend to knock. If the increase in gasoline for the power mixture would be reduced and the introduction of a supplemental fuel, such as alcohol and water, be substituted, the resulting mixture delivered to the engine supercharger will be cooler and produce more power and at the same time knock will be prevented.

An important object of my invention is to produce a system in which the injection of a supplementary fuel into the supercharger is automatically controlled by the engine manifold pressure, and at the same time the regular gasoline fuel supply is automatically reduced or made leaner so that the resulting mixture delivered to the engine will produce the required power without engine knock.

A further object is to provide arrangement and control in the system so that when no supplementary fuel is available, as when the supplementary fuel tank is empty or delivery therefrom is interrupted for any reason, the regular power gasoline delivery from the carburetor will not be limited or interfered with.

Another important object is to provide means under manual control for limiting the power gasoline supply, or to prevent such limitation by the automatic means.

The arrangement, operation and advantages of my improved system will become apparent from the following specification in connection with the drawing, which drawing shows more or less diagrammatically the various operating elements for the injection of supplementary fuel and part of an injection carburetor with the structure applied thereto for automatically limiting or leaning the regular fuel mixture at the time when the supplementary fuel is introduced.

Briefly, in my improved system, the supplementary fuel is delivered under pressure by a pump from a supply tank to a nozzle for delivery in connection with the regular gasoline delivery to the engine, the flow of the supplementary fuel being under control of a valve whose operation is controlled by the pressure produced in the engine manifold by a supercharger. When a predetermined manifold pressure, or other condition indicating need of supplemental fuel mixture, is reached, the automatic valve will function for delivery of supplemental fuel, and electrically or otherwise controlled means then function for the desired reduction in, or leaning of, the regular fuel so that the mixture delivered to the engine will result in the desired operation of the engine.

On the drawing, a supply tank T contains the supplementary fuel and P indicates a pump driven by an electric motor M. Any suitable pump may be used, such as the pump disclosed in Curtis Patent 2,268,805 dated January 6, 1942. The automatic valve V may be of the type such as disclosed in Kimball Patent 2,167,266 dated July 25, 1939. The operation of the valve is substantially like that disclosed in the Kimball patent. The pressure in the manifold communicates through the pipe 10 with the chamber 11 to act upon the bellows 12, the stem 13 extending from the bellows through the passageway 14 into the chamber 15 for connection with the bell-crank lever 16 secured to the shaft 17. The lever 16 engages the top of the valve stem 18 which carries the cutoff valve 19 and the metering valve 20. The valve stem extends through the bellows 21 and is secured to the top thereof, a spring 22 tending to expand the bellows for upward movement of the stem for closure of the valves. The valve structure V has the outlet 23 communicating with the space below the seat 24 for the metering valve, and the inlet 25 communicating with the interior of the bellows 21 for communication through ports 26 with the space above the seat 24 when the cutoff valve 19 is unseated. A pipe 27 connects the outlet of the pump P with the inlet 25 of the valve structure and a pipe 28 extends from the outlet 23 for delivery of the supplementary fuel. The pump P is preferably continuously driven by the electric motor M ready to supply supplementary fuel under pressure when the valve structure V is opened. The pump P, such as a pump shown in the Curtis Patent 2,268,805, is provided with by-pass means which is adjustable for the desired constant pressure out-put of the pump, and this adjustment could be made in accordance with the characteristics of the engine to be served by the supplemental fuel. The pump pressure together with the spring 22 will normally hold the valve structure V closed. When the manifold pressure becomes sufficiently high in the chambers 11 and 15 of the valve structure to overcome the pump pressure and the spring, the bellows 12 and 21 will co-operate to effect downward movement of the valve stem 18 for opening of the cutoff valve 19 and the metering valve 20. The supplementary fuel will then flow from the valve structure V under control of the metering valve to be delivered by the pipe 28 to the engine supercharger to flow with the regular gasoline power mixture into the engine manifold for delivery to the engine. The supplementary fuel could be delivered through a separate nozzle or, as shown, the pipe 28 may terminate at the nozzle 29 for mingling of the supplementary fuel with the regular power fuel to form the combustion mixture to be delivered.

I have shown more or less diagrammatically the valving arrangement in an injection carburetor for controlling the flow of the regular power fuel such as gasoline to the nozzle 29 to be carried when the throttle valve 10 is opened with the air flow from the air scoop 71 to the supercharger 72 for delivery to the intake manifold 73. The power fuel enters through the passageway 30 under pressure, as from a pump (not shown). The idling needle valve 31 controls the flow through the idle jet 32 from the inlet passageway 30 to the cross passageway 33. A cruising metering jet 34 controls the flow into the chamber 35 from which the pipe 36 extends to the nozzle 29. The jet 34 is controlled by the valve 37. At times, such as at take-off of an airplane, a full rich power mixture is required which the cruise metering jet may be unable to supply, and a so-called economizer valve 38 is then opened for additional power flow from the cross passage 33 into the outlet chamber 35, the economizer power flow being controlled by the jet 39. When such full rich power fuel is delivered to the engine for high speed operation thereof, the engine will rapidly heat and knocking may occur, which is undesirable. In accordance with my invention, I cut down the amount of gasoline delivered during such high speed operation, and for the amount of gasoline flow withheld I substitute supplementary fuel, such as equal parts of alcohol and water, for delivery by the pump P to the gasoline nozzle 29. As shown, one way of accomplishing the limitation or leaning of the gasoline flow is by control of the jet 39 for the economizer valve 38. This restriction to flow through the economizer jet 39 occurs as soon as the valve structure V has been opened by the high manifold pressure for delivery of the supplementary fuel. As shown, a needle valve 40 is projected through the side wall of the carburetor for cooperation with the jet 39. I have shown electrical means for controlling this needle valve. The valve terminates in a solenoid core 41 to be operated by a coil 42, which when energized, will shift the core and the needle valve inwardly, a spring 43 tending to hold the core in its outer position with the point of the needle valve withdrawn for free flow through the jet 39. A housing 44 secured to the carburetor wall encloses the coil and the core, a stop collar 45 on the core limiting the outward movement of the core by the spring. The inward movement of the core for the desired degree of flow restriction through the jet 39 is determined by a collar 46 mounted to be adjustable on the core outside of the end of the housing 44 so as to abut the housing when the core is shifted inwardly and so determine the degree of restriction of the jet 39.

The circuit for the coil 42 is automatically controlled by the operation of the valve structure V. Extending from the outer end of the shaft 17 of the valve structure V is a switch arm 47 for engagement with a contact 48 when the valve V is opened for flow of supplemental fuel. The switch arm 47 is connected by the conductor 49 with one terminal of the winding 42 whose other terminal is grounded. The contact 48 is connectable through the conductor 50 with one terminal of the battery B whose other terminal is grounded. On engagement of the switch arm 47 with the contact 48 this electrical circuit will be closed for energization of the coil 42 and inward shift of the needle valve 40 for restricting the gasoline flow through the jet 39. This circuit will be kept closed so long as the manifold pressure is sufficient to hold the valve V open, and when the manifold pressure decreases to a point where no supplemental fuel is desired, the valve V will close and the circuit through the coil 42 will open for retraction of the needle valve 40 by the spring 43. Thus, when the speed of the engine and the manifold pressure become such that feeding of supplemental fuel is desirable, such fuel will be delivered, but at the same time the outflow of gasoline to the nozzle from the carburetor will be correspondingly restricted in order that the engine may receive the proper combustion mixture for operating at its highest efficiency and without the occurrence of knock.

Provision must be made so that, in the event of failure of supplementary fuel flow when it is required, the valve 40 will be prevented from restricting the gasoline flow in order that the engine may be operated by the power fuel aline. Such failure of supplementary fuel may result from the tank T being empty, or upon failure of functioning of the pump. I have therefore provided a safety switch S under control of the pump pressure for controlling the circuit for the needle valve coil. As shown, a tap 51 from the pump outlet pipe 27 communicates with the interior of a bellows 52 within a housing 53. When the tank has supplementary fuel therein and the pump is functioning properly, the pressure will expand the bellows 52 for movement by its stem 54 of the switch contact 55 into engagement with the contact 56. This safety switch is included in the supply line 50 from the battery to the switch 48 controlled by the valve V. With the safety switch held closed by the pump pressure, closure of the switch 48 at the valve V will then close the electrical circuit for the needle valve coil for operation of the needle valve to restrict the power fuel flow from the carburetor. However, in case of failure of the pump to deliver supplementary fuel, the bellows 52 will be collapsed by the spring 57 for opening of the safety switch, thereby preventing functioning of the needle valve 40 even though the switch 48 at the valve V is closed.

The valve V may be operated manually by the pilot in the event more supplementary fluid is desired at any time than would be delivered by the automatic operation of the valve. This is accomplished by the cam 58 engageable with the lever 16 by rocking of the arm 59 extending from the cam shaft.

At times it may be desirable to operate the needle valve 40 manually. As shown, this may be accomplished by the extension of a Bowden wire 60 from the valve to the cockpit of the airplane. With such manual control, the pilot could pull the valve 40 outwardly to limit the restricting movement of the valve electrically by the coil 42.

I have shown practical and efficient embodiment of the various features of my invention but I do not desire to be limited to the exact arrangement and operation shown and described as changes and modifications may be made without departing from the scope of the invention as defined in the appended claims.

I claim as my invention:

1. The combination with a carburetor structure having control jets for controlling the flow of power fuel from a power fuel source to a supercharger for delivery to the manifold of an internal combustion engine, of a control assembly for controlling the delivery of supplementary anti-knock fuel for mixture with the power fuel delivered from the carburetor structure, said control assembly comprising a reservoir for the supplementary fuel, a pump for charging the supplementary fuel at a predetermined pressure, a supplementary fuel flow controlling valve jointly controlled by the pressure of the flow from said pump and the pressure produced in the engine manifold by the supercharger, said control valve being opened as soon as the manifold pressure reaches a predetermined value relative to the pump pressure for flow of supplementary fuel into the supercharger, a restricting valve for one of the flow jets of the carburetor structure normally in position for free flow of power fuel through said jet, and electromagnetic means controlled upon opening of said control valve for setting said restricting valve for restricting the flow through said jet for leaning of the power fuel flow from the carburetor structure to the supercharger in predetermined proportion to the volume of supplementary fuel delivered to the supercharger.

2. The combination with a carburetor structure having control jets for controlling the flow of power fuel from a power fuel source to a supercharger for delivery to the manifold of an internal combustion engine, of a control assembly for controlling the delivery of supplementary anti-knock fuel for mixture with the power fuel delivered from the carburetor structure, said control assembly comprising a reservoir for the supplementary fuel, a pump for charging the supplementary fuel at a predetermined pressure, a supplementary fuel flow controlling valve jointly controlled by the pressure of the flow from said pump and the pressure produced in the engine manifold by the supercharger, said control valve being opened as soon as the manifold pressure reaches a predetermined value relative to the pump pressure for flow of supplementary fuel into the supercharger, a restricting valve for one of said carburetor structure control jets, means functioning automatically when said control valve opens for setting said restricting valve to restrict the flow through said jet to thereby reduce the flow of power fuel from the carburetor structure to the supercharger in proportion to the volume of supplementary fuel delivered through said control valve to the supercharger, and means for preventing the automatic operation of said restricting valve upon failure of said pump to deliver supplementary fuel to said control valve.

3. The combination with a carburetor structure having control jets for controlling the flow of power fuel from a power fuel source to a supercharger for delivery to the manifold of an internal combustion engine, of a control assembly for controlling the delivery of supplementary anti-knock fuel for mixture with the power fuel delivered from the carburetor structure, said control assembly comprising a reservoir for the supplementary fuel, a pump for charging the supplementary fuel at a predetermined pressure, a supplementary fuel flow controlling valve jointly controlled by the pressure of the flow from said pump and the pressure produced in the engine manifold by the supercharger, said control valve being opened as soon as the manifold pressure reaches a predetermined value relative to the pump pressure for flow of supplementary fuel into the supercharger, a restricting valve for one of the flow jets of the carburetor structure normally in position for free flow of power fuel through said jet, electromagnetic means controlled upon opening of said control valve for setting said restricting valve for restricting the flow through said jet for leaning of the power fuel flow from the carburetor structure to the supercharger in predetermined proportion to the volume of supplementary fuel delivered to the supercharger, and means preventing functioning of said electromagnetic means to thereby prevent restricting movement of said restricting valve in the event that said pump fails to deliver supplementary fuel to said control valve.

4. The combination with a carburetor structure having control jets for controlling the flow of power fuel from a power fuel source to a supercharger for delivery to the manifold of an internal combustion engine, of a control assembly for controlling the delivery of supplementary anti-knock fuel for mixture with the power fuel delivered from the carburetor structure, said control assembly comprising a reservoir for the supplementary fuel, a pump for charging the supplementary fuel at a predetermined pressure, a supplementary fuel flow controlling valve jointly controlled by the pressure of the flow from said pump and the pressure produced in the engine manifold by the supercharger, said control valve being opened as soon as the manifold pressure reaches a predetermined value relative to the pump pressure for flow of supplementary fuel into the supercharger, a restricting valve for one of the flow jets of the carburetor structure normally in position for free flow of power fuel through said jet, electromagnetic means controlled upon opening of said control valve for setting said restricting valve for restricting the flow through said jet for leaning of the power fuel flow from the carburetor structure to the supercharger in predetermined proportion to the volume of supplementary fuel delivered to the supercharger, and means whereby said restricting valve may be set manually independently of said electromagnetic means.

5. In combination with a power fuel feed structure for feeding power fuel to an internal combustion engine, apparatus for feeding anti-knock fuel for mixture with the power fuel delivered to the engine, said apparatus comprising a pump for delivering supplementary fuel, a valve structure controlled by the pump pressure and the pressure of the engine manifold for controlling delivery of the supplementary fuel, electrically operable means for reducing the volume of power fuel flow upon increase of delivery of supplementary fuel, an electrical power circuit for said electrically operable means conjointly controlled by said valve structure and said pump for operation of said electrically operable means when said pump is functioning but opened upon failure of pump delivery to thereby prevent operation of said electrically operable means.

DAVID E. ANDERSON.

REFERENCES CITED

The following references are of record in the file of this patent:

UNITED STATES PATENTS

| Number | Name | Date |
|---|---|---|
| 1,758,897 | Evans | May 13, 1930 |
| 2,031,527 | Dodson | Feb. 18, 1936 |
| 2,129,930 | Hans | Sept. 13, 1938 |
| 2,142,979 | Hans | Jan. 3, 1939 |
| 2,392,565 | Anderson et al. | Jan. 8, 1946 |